United States Patent [19]

Lawson

[11] Patent Number: 4,547,945
[45] Date of Patent: Oct. 22, 1985

[54] TIRE AND WHEEL ALIGNMENT SYSTEM

[75] Inventor: Lawrence J. Lawson, Troy, Mich.

[73] Assignee: Dominion Tool & Die Company, Inc., Roseville, Mich.

[21] Appl. No.: 665,493

[22] Filed: Oct. 29, 1984

Related U.S. Application Data

[63] Continuation of Ser. No. 327,720, Dec. 4, 1981, abandoned, which is a continuation-in-part of Ser. No. 293,291, Aug., 1981, abandoned.

[51] Int. Cl.⁴ .................. B23Q 17/00; B23P 19/00
[52] U.S. Cl. .................................... 29/407; 29/802
[58] Field of Search ................ 73/146; 29/464, 559, 29/802, 407; 157/1, 1.1

[56] References Cited

U.S. PATENT DOCUMENTS

| | | | |
|---|---|---|---|
| 3,949,794 | 4/1976 | Marshall | 157/18 |
| 4,198,858 | 4/1980 | Farmer et al. | 73/146 |
| 4,241,300 | 12/1980 | Hayes et al. | 157/13 X |
| 4,359,897 | 11/1982 | Ugo | 73/146 |

Primary Examiner—James G. Smith
Attorney, Agent, or Firm—Harness, Dickey & Pierce

[57] ABSTRACT

A mechanism for aligning a tire on a wheel in a single station comprising a rotating mechanism to rotate either the wheel or tire. A sensing mechanism to sense the presence of indicia on one of the wheel or tire as it is rotated and to then actuate a holding mechanism to grip either the wheel or tire thus preventing rotation. The sensing mechanism further senses the presence of indicia on the other of the wheel or tire as it is rotated and to cause the rotation thereof to stop at a predetermined location to assure accurate relative alignment of the wheel and tire.

22 Claims, 10 Drawing Figures

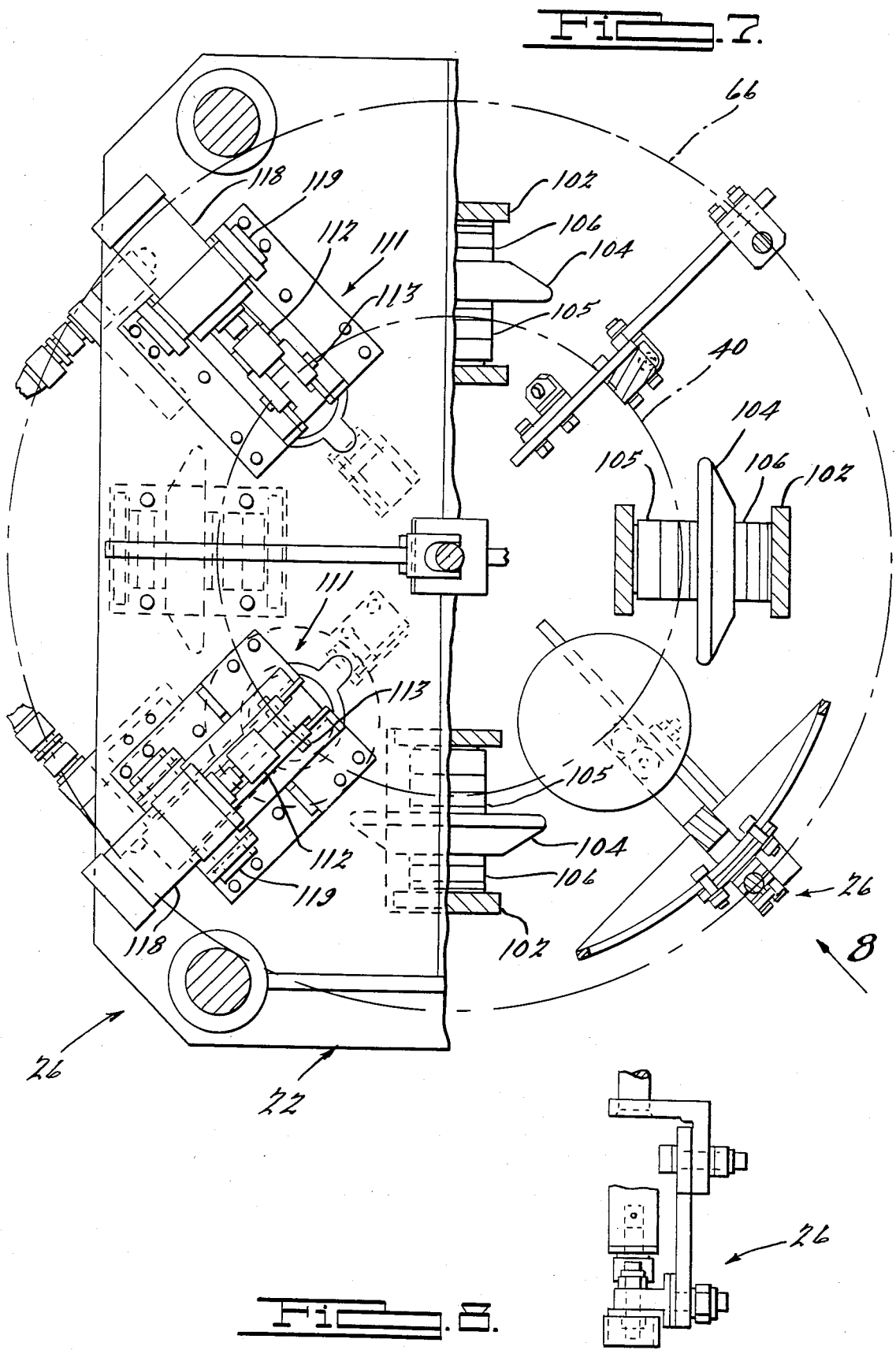

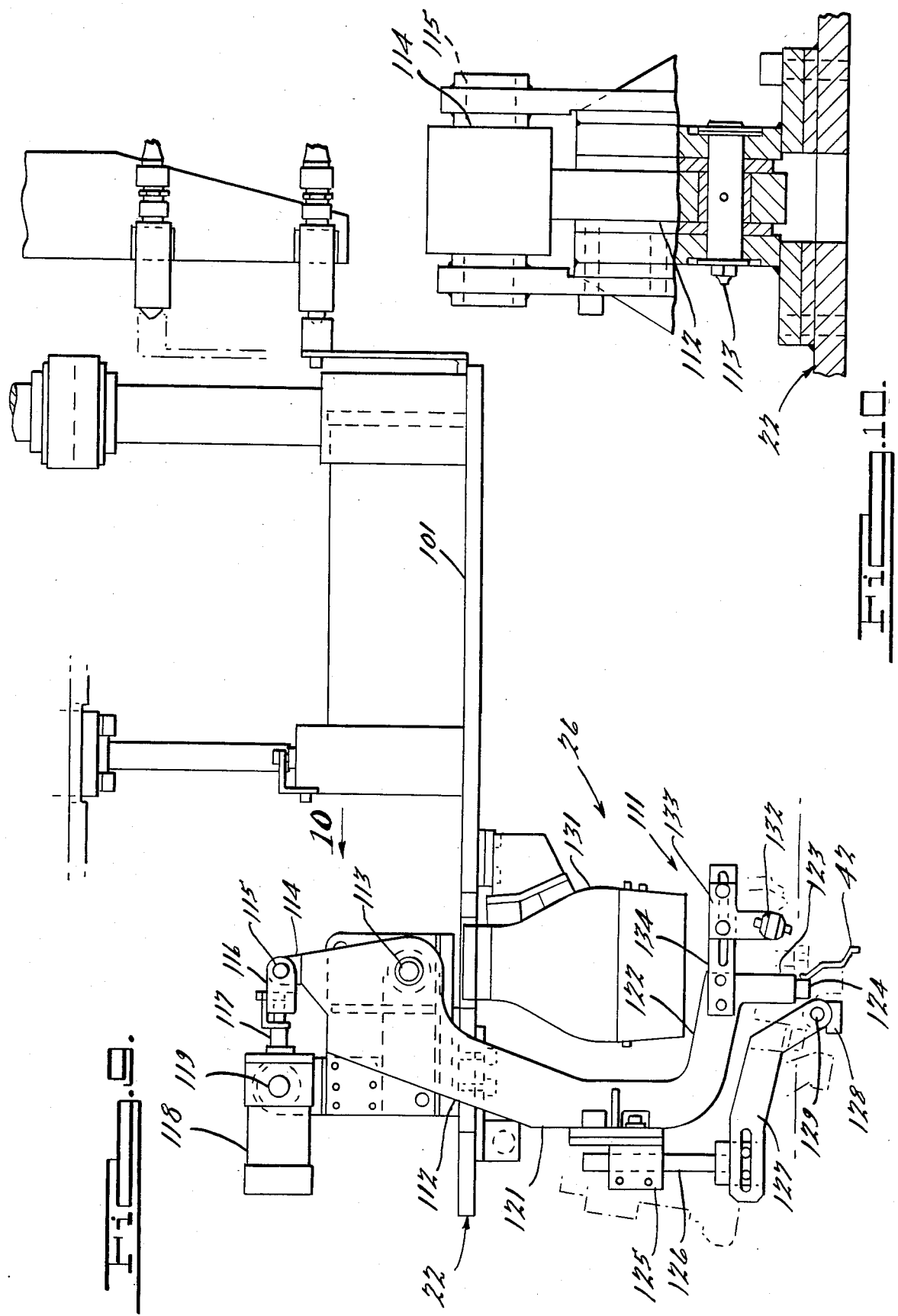

TIRE AND WHEEL ALIGNMENT SYSTEM

CROSS REFERENCE TO RELATED APPLICATION

This application is a continuation of application Ser. No. 327,720, filed Dec. 4, 1981, now abandoned, which is a continuation-in-part of my application of the same title, Ser. No. 293,291 filed Aug. 17, 1981 now abandoned, and assigned to the Assignee of this application.

BACKGROUND OF THE INVENTION

This invention relates to a tire and wheel alignment system and more particularly to a system and mechanism for correctly orienting a mounted tire relative to a wheel prior to its inflation.

As is well known, the balance and roundness of a tire and mounted wheel is particularly important to the good ride of a motor vehicle and to minimize unnecessary vibrations. Although considerable efforts have been put toward insuring accurate roundness of both the tire and wheel, it is nearly impossible to insure one hundred percent accuracy. Furthermore, even though the tire and wheel may be held true to their desired specifications, when mounted upon the wheel the wheel and tire assembly may not be truly round. It has been found that considerable cost savings may be enjoyed as well as improving both ride and vibration resistance if the tire and wheel are accurately oriented relative to each other when inflated so that the complete assembly assumes a more nearly rounded configuration. This may be done if the high spot on the wheel is aligned with the low spot on the tire. Thus, even though the individual components may be out of round the final assembly more closely approaches a true condition.

It is, therefore, a principal object of this invention to provide an apparatus for accurately locating mounted tires relative to finished wheels prior to inflation of the tire.

It is another object of the invention to provide an improved apparatus which permits matching of the high spot on a tire with a low spot on the wheel so as to insure a more round completed assembly.

Although it may appear simple in retrospect to mount a tire so that its high spot is aligned with the low spot on the wheel or vice versa, it is extremely difficult to put this concept into practice. This is particularly true on the production line where high volume of wheels and tires must be handled and, furthermore, where there may be a considerable variation of mix of nominal tire and wheel sizes. Also, it is extremely important to insure that the alignment is accomplished as near as possible to the final inflation of the tire so as to insure that the match-up is not destroyed during subsequent handling operations.

It is, therefore, a still further object of this invention to provide an improved apparatus for aligning a mounted tire on a wheel which permits high volume handling and which minimizes the likelihood of disarrangement prior to inflation.

SUMMARY OF THE INVENTION

This invention is adapted to be embodied in a machine for alingning a mounted tire on a wheel comprising locating means for sensing a location of one of the wheel and tire in a desired position. Means are incorporated for holding the one of the wheel and tire against rotation while a rotating means rotates the other of the wheel and tire. Means are provided for halting the rotation of the other of the wheel and tire when it is in a predetermined relative position to the one of the wheel and tire so that the completed wheel and tire assembly is in the desired orientation.

BRIEF DESCRIPTION OF THE DRAWINGS

FIG. 7 is an enlarged top plan view taken on different horizontal sections showing the sensing mounting arrangement.

FIG. 8 is a view taken in the direction of the arrow 8 in FIG. 7.

FIG. 9 is a side-elevational view of the sensing mechanism shown in FIGS. 7 and 8.

FIG. 10 is an enlarged elevational view, with portions broken away, taken generally in the direction of the arrow 10 in FIG. 9.

DETAILED DESCRIPTION OF THE PREFERRED EMBODIMENT

Figure 1:
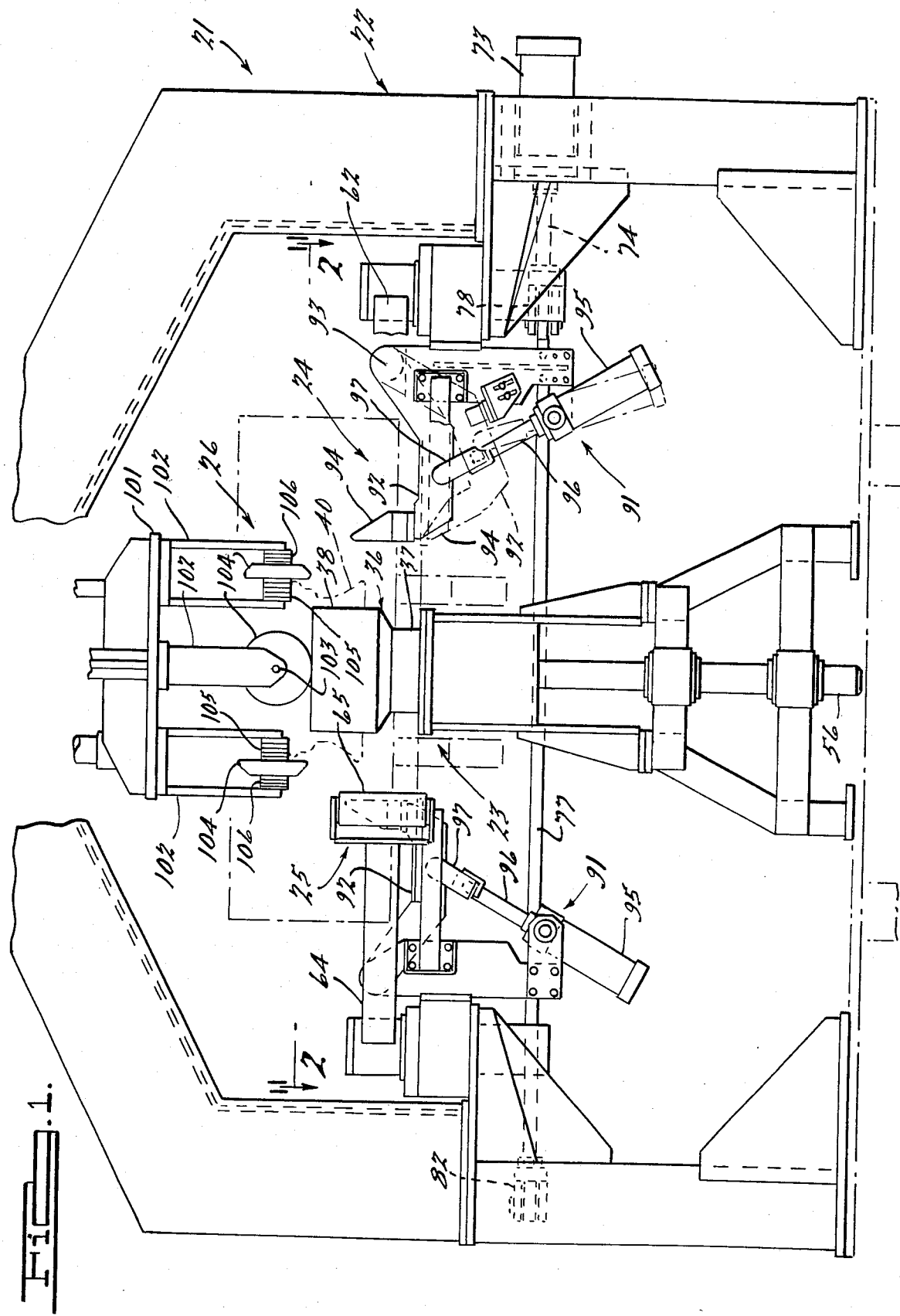
FIG. 1 is a side-elevational view of a tire and wheel alignment device incorporating this invention.

A wheel and tire alignment apparatus embodying this invention is identified in the drawings generally by the reference numeral 21. As will become apparent, the apparatus 21 is adapted to receive a wheel and mounted but uninflated tire. In accordance with a preferred embodiment of the invention, the wheel and mounted tire are then gripped by a rotating device so that the complete assembly may be rotated, and are lifted to a predetermined, pre-established position. The wheel and tire are then rotated as a unit until either the wheel or the tire reaches a position wherein a pre-established indicia is at the desired location. This element is then held against rotation. The remaining element (either the wheel or tire) is then rotated until its pre-established indicia is at the desired location relative to the other element. This element is then held against rotation and the oriented wheel and tire may then be passed to an inflator for subsequent inflation. As will become apparent as this description proceeds, particularly to those skilled in the art, various other sequences of operation are possible with the apparatus disclosed and certain portions of the apparatus may have application for use in other wheel and tire alignment devices or in other devices for handling wheels and/or tires.

The apparatus 21 is adapted to be positioned on an automatic line where tires are mounted onto wheels and inflated. The apparatus 21 may be mounted between the stations where the tire is mounted on the wheel and the station where it is inflated. Alternatively, the apparatus 21 may be incorporated in either the mounting and/or inflating station or all three stations may be combined in one. Such modifications are believed to be obvious to those skilled in the art and need not be described in specific detail.

The apparatus 21 includes a number of subcomponent assemblies which are supported on a common frame, indicated generally by the reference numeral 22. These include the wheel and tire rotating device, indicated generally by the reference numeral 23, the tire clamping devices, indicated generally by the reference numeral 24, the primary locating devices, indicated generally by the reference numeral 25, and the locating and sensing assembly, indicated generally by the reference numeral 26. The apparatus 21 is designed so that it can handle a wide variety of tire and wheel sizes and designs without necessitating any change in its operating sequence or in its mechanism. That is, the device 21 may be used to align on a production line basis a wide mix of wheel and tire combinations.

Wheels and mounted but uninflated tires are delivered to the apparatus 21 when the rotating device 23 is in a lowered position, as will become apparent. The locating devices 25 are first actuated so as to centrally locate the tire and wheel over the rotating device 23. The rotating device 23 is then raised so that the center of the wheel will be grasped and so that the wheel and tire will be lifted into engagement with the locating and sensing device 26. The rotating device 23 is then operated so as to rotate both the wheel and the mounted tire. The sensing device 26 reads the tire until a mark or indicia on the tire indicative of its high or low point is sensed. The tire clamping devices 24 will then be actuated so as to hold the tire against further rotation. The wheel is then rotated by the rotating device 23 independently of the tire until the sensing device 26 reads the appropriate legend on the wheel to indicate that it is in the desired relationship to the already clamped tire. The rotating device 23 is then stopped, the clamping device 24 released and the aligned wheel and tire are lowered so that they may be passed on to the next station for inflation. As has been aforenoted, this sequence of operations may be changed and certain steps either eliminated or modified without departing from the invention.

Figure 3:
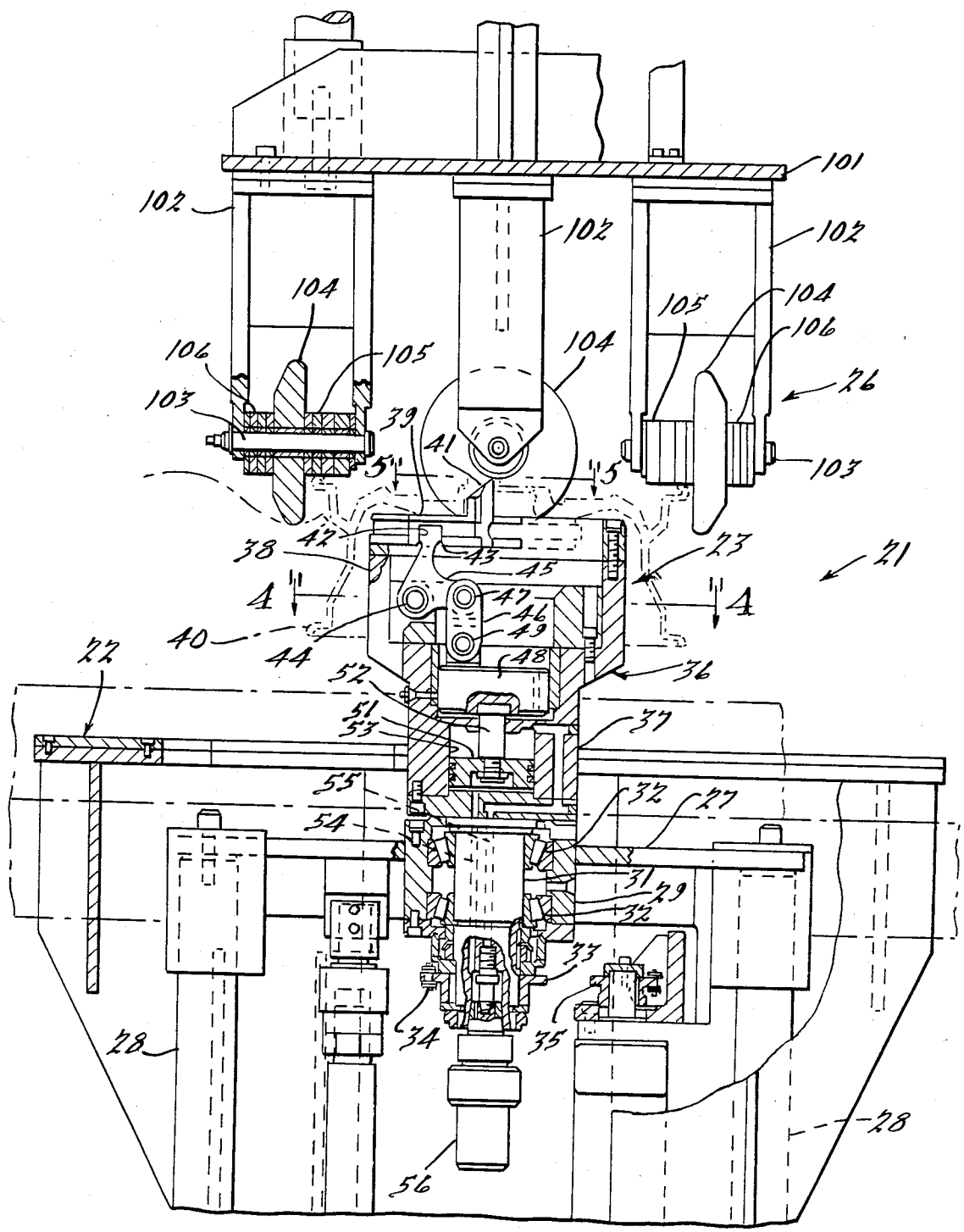
FIG. 3 is a cross-sectional view taken along the line 3—3 of FIG. 2.
Figure 4:
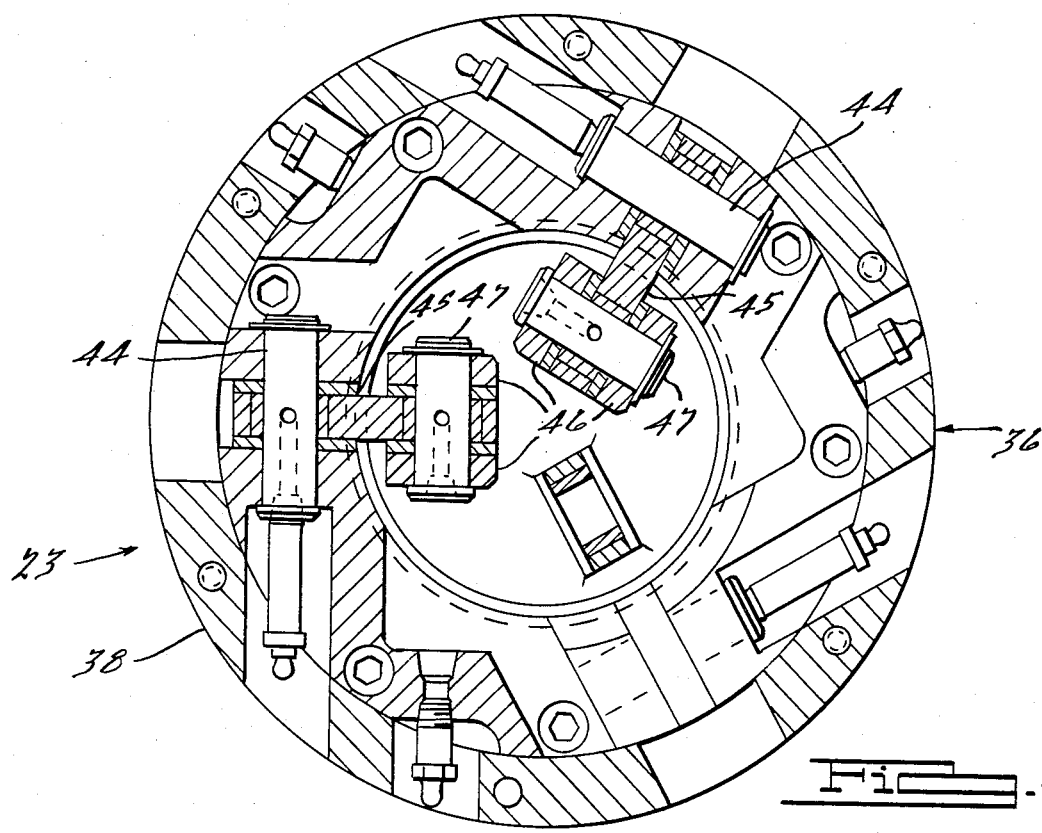
FIG. 4 is an enlarged cross-sectional view taken along the line 4—4 of FIG. 3.
Figure 5:
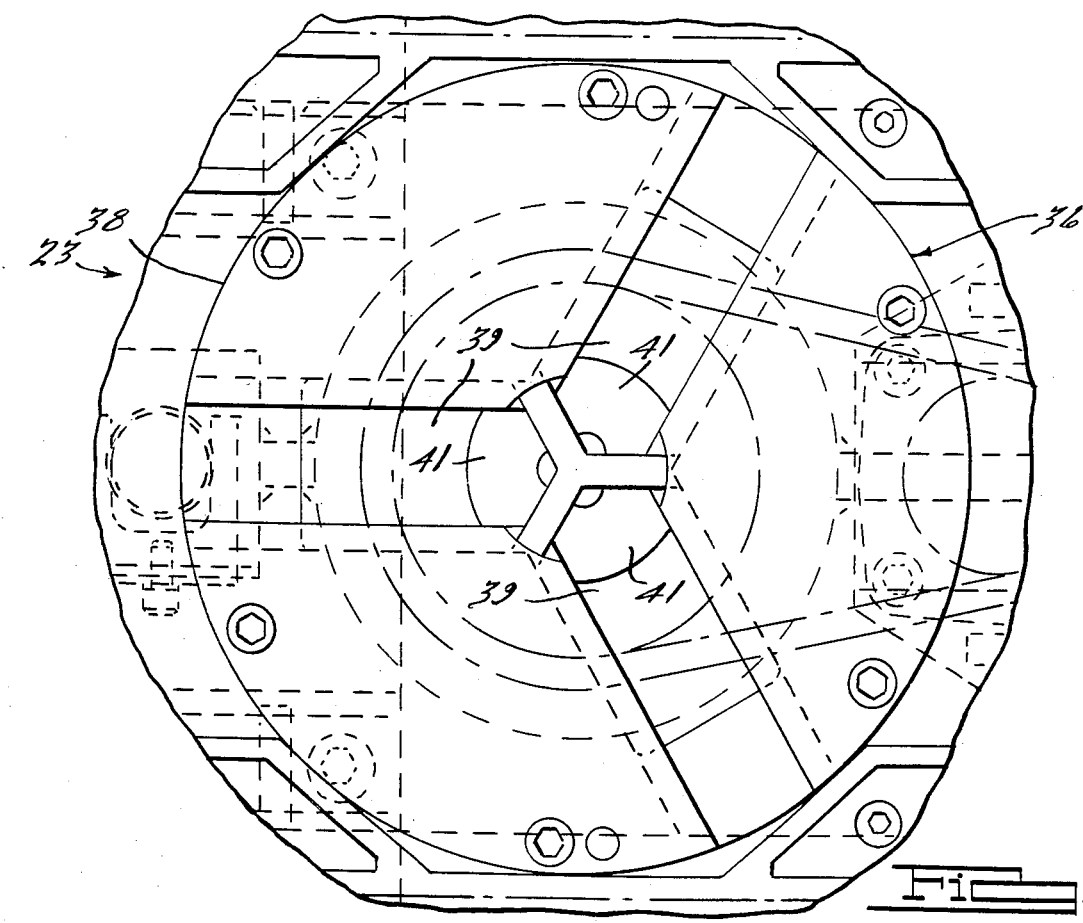
FIG. 5 is a top plan view of the wheel clamping jaws and is taken generally along the line 5—5 of FIG. 3.

The rotating device 23 is shown in most detail in FIGS. 3 through 5 and includes a platform or table 27 which is carried on the piston rods 28 of four hydraulic or pneumatically operated cylinder assemblies so that the table 27 and the mechanism associated with it may be selectively raised and lowered. The table 27 has a hub portion 29 in which a shaft 31 is supported for rotation by a pair of spaced bearings 32. Beneath the lower most of the bearings 32 and externally of the hub 29, a driven sprocket 33 is affixed against rotation to the shaft 31. A chain 34 encircles the sprocket 33 and a driving sprocket 35 which is driven by a suitable motor and speed reducer (not shown).

The upper end of the shaft 31 is affixed to a driving head assembly, indicated generally by the reference numeral 36, which includes a lower cylindrical portion 37 and a head portion 38. Three jaws 39 are supported for reciprocation in cooperating slots formed in the head portion 38 and have upstanding parts 41 that are adapted to extend into the center of the wheel to be aligned, which is shown in phantom in FIG. 3 and is identified by the reference numeral 40. The jaws 39 have slots 42 in which are received one arm 43 of a respective bell crank which is supported for pivotal movement on the head 38 by means of a respective pivot pin 44. Each bell crank has another arm 45 that is connected to one end of a link 46 by means of a pivot pin 47. The lower end of the links 46 are pivotally connected to an upstanding trunion of an actuating piston 48 by means of a respective pivot pin 49. It should be readily apparent that as the piston 49 moves upwardly or downwardly the bell crank arms 43 and 45 will pivot about the pivot pin 44 and cause the jaws 39 to reciprocate between a retracted and an expanded position as will become apparent.

The acuating piston 48 is coupled to a piston 51 of a pneumatic motor by means of a short connecting rod 52. The piston 51 is in turn supported for reciprocation within a bore 53 formed in the housing portion 37. A pair of pneumatic passages 54 and 55 extend through the shaft 31 and housing portion 37 and terminate respectively on the lower and upper sides of the piston 51. The passages 54 or 55 are selectively pressurized or vented to atmosphere via means including a connector 56 which is in turn connected by a flexible conduit to a control valve and source of pressure. When the conduit 54 is pressurized and the conduit 55 is vented to atmosphere the piston 51 will be forced upwardly driving the acuating piston 48 upwardly until the jaw portions 41 contact the interior of the center of the wheel 42. The wheel 41 will then be clamped for rotation with the rotating device 23. Alternatively, when the conduit 54 is vented to atmosphere and the conduit 55 is pressurized, the piston 51 will be driven downwardly causing the acuating piston 48 also to move downwardly and pivot the bell crank arms 43 and 45 so that the jaw portions 41 will be moved radially inwardly and the wheel 42 will be released.

Figure 2:
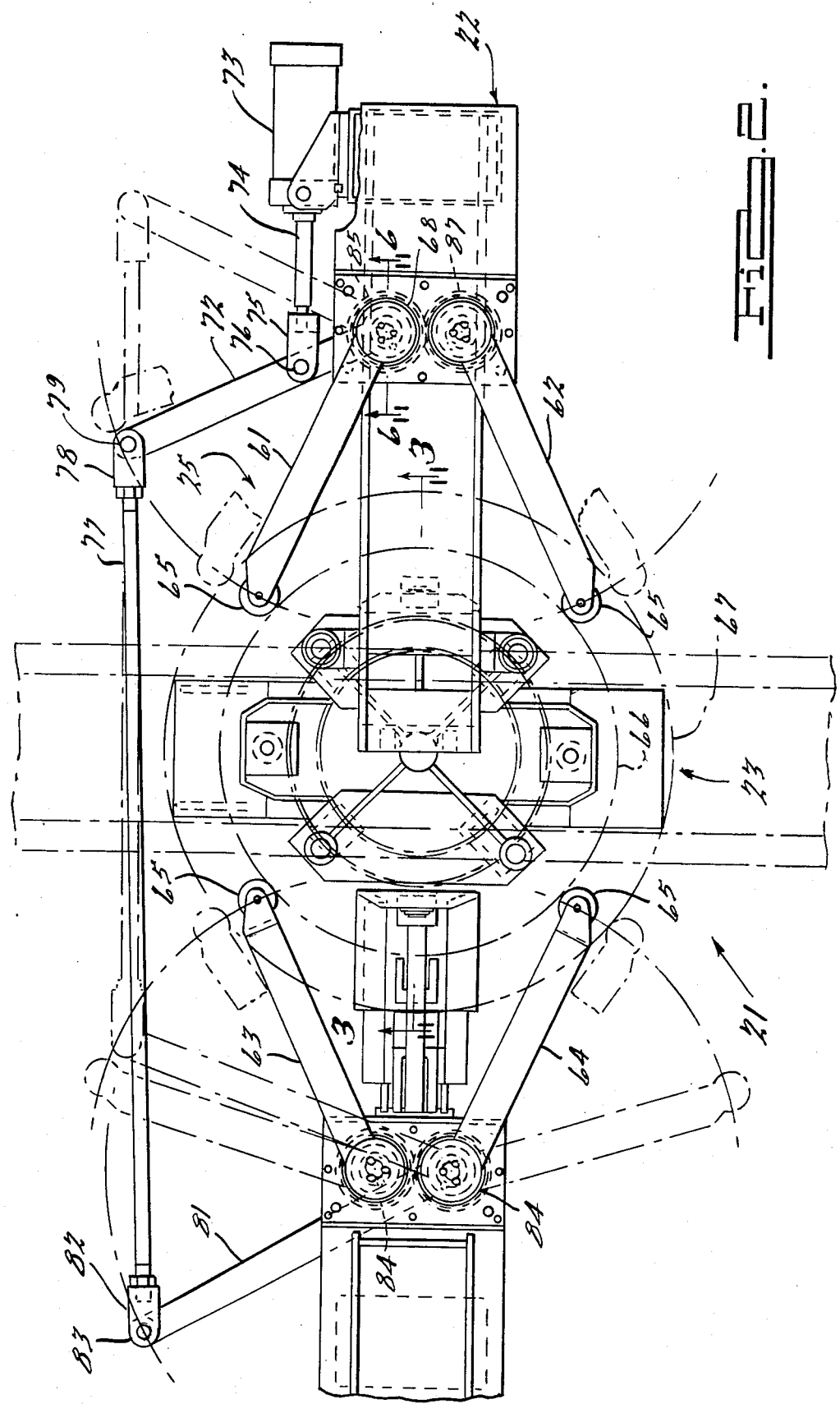
FIG. 2 is an enlarged top plan view of the device looking generally in the direction of the line 2—2 in FIG. 1.
Figure 6:
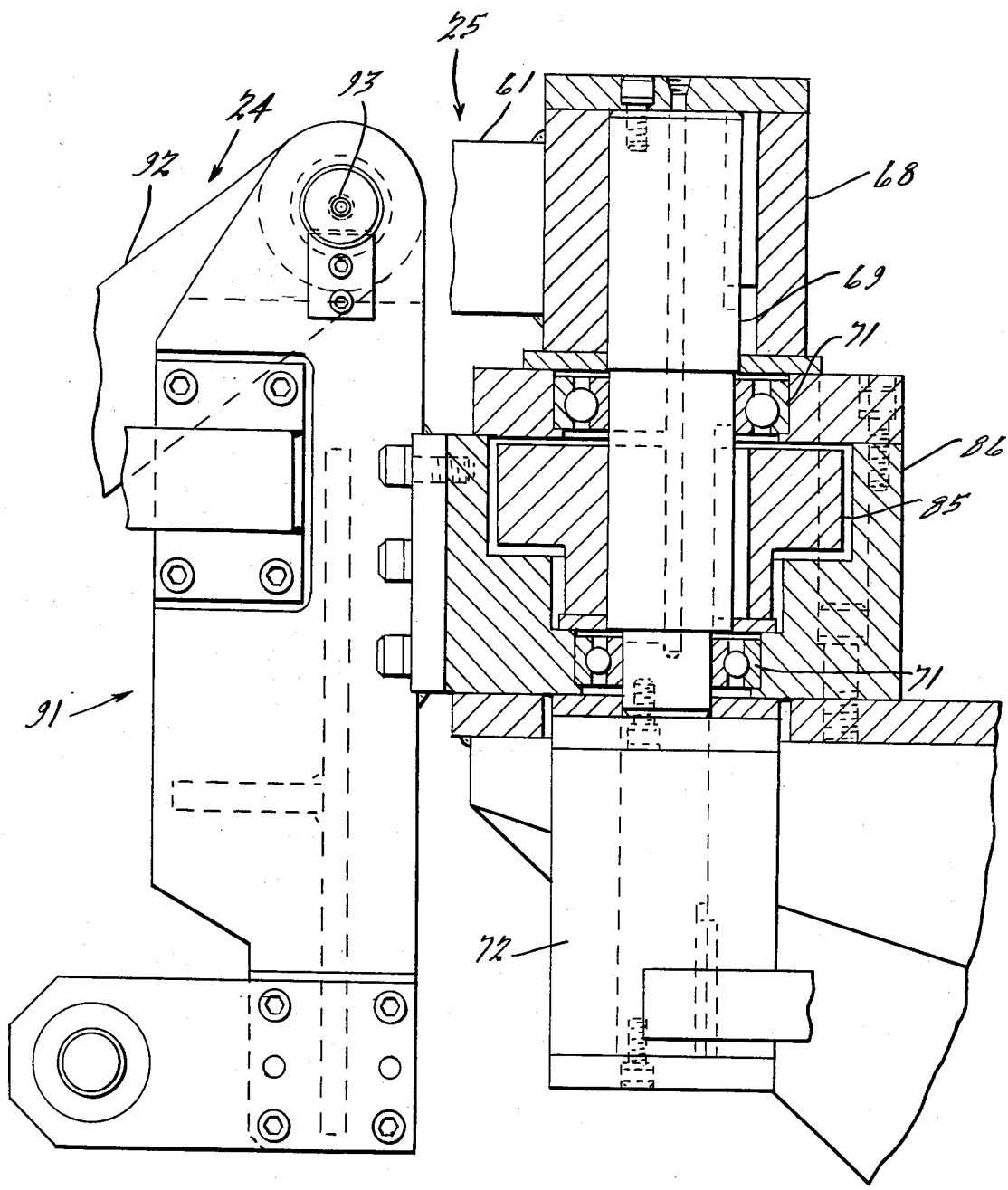
FIG. 6 is an enlarged cross-sectional view taken along the line 6—6 of FIG. 2.

The locating device 25 is shown best in FIGS. 1, 2, and 6 and comprises four arms 61, 62, 63 and 64 each of which carries a roller 65 at its outer end that is adapted to engage the outer periphery of a tire delivered to the device 21 along with the mounting wheel. In FIG. 2 the smallest diameter tire with which the apparatus is adapted to cooperate is shown by the phantom circle 66 while the largest tire is shown by the phantom circle 67.

The arm 61 is affixed against rotation to a hub 68 which is, in turn, affixed against rotation to a shaft 69 that is supported in a pair of spaced bearings 71. An operating arm 72 is affixed to the lower end of the shaft 69 and thus is non-rotatably connected to the arm 61. A pneumatic cylinder 73 is provided for acuating the centering device 25 and for this purpose has its piston rod 74 pivotally connected to the acuating arm 72 by means of a clevice 75 and pivot pin 76. An interconnecting link 77 is also pivotally connected by means of a clevice 78 and pivot pin 79 to the outer end of the actuating arm 72. The link 75 operates a slave arm 81 by means of a clevice 82 and pivot pin 83. The slave arm 81 is rigidly connected to the shaft 84 to which the arm 63 is also affixed, as with the arms 61 and 72. Thus, oscillation of the arms 72 and 61 will be transmitted through the link 77 into oscillation of the arms 81 and 63.

Oscillation of the arm 61 is transmitted into oscillation of the arm 62 and oscillation of the arm 63 is translated into oscillation of the 64. This is accomplished by means of a gear connection between the shafts which rotatably support the arms 61, 62, 63 and 64. This gear connection is best shown in FIG. 6 wherein the arrangement associated with the arm 61 and its supporting shaft 69 is shown. The shaft 69 has a drive gear 85 affixed to it between the bearings 71. The drive gear 85 is contained within a protective housing 86 that supports the bearings 71. In a like manner, a driven gear 87 (FIG. 2) is contained within the housing 86 and is enmeshed with the drive gear 87. The driven gear 87 is affixed to the arm 62 in a manner similar to that in which the gear 85 is affixed to the arm 61. Thus, as the arm 61 oscillates, the arm 62 will oscillate in the opposite direction. A similar connection is provided between the arms 63 and 64 and due to this similarity, the construction of this connection will not be described in detail.

The tire clamping device 24 may be best understood by reference to FIG. 1. The clamping device 24 consists of a number of identical clamping units, indicated generally by the reference numeral 91. In the illustrated embodiment there are four such clamping units 91 which cooperate with the locating and sensing device 26 in a manner to be described. Each clamping device 91 consists of an arm 92 that is supported for pivotal movement on the frame 22 in any known manner. The arms 92 pivot about respective fixed pivot axes 93 and have upstanding arms 94 that are adapted to engage the tire in a manner to be described. Each arm 92 is pivoted between a retracted and a clamping position by means of a pneumatic cylinder 95. The cylinder 95 has a piston rod 96 that is pivotally connected to the arm 92 by means of a clevice 97 for movement between a withdrawn or release position, as shown in the phantom line view of FIG. 1, to an engaged or operative position as shown in the solid line portion of this view.

The locating portion of the locating and sensing device 26 may be best understood by reference to FIGS. 1 and 3. The device 26 includes a fixed member 101 that is carried by the frame 22 and which may be adjustably positioned relative to the frame 22 so as to accommodate wheels having considerably different axial width. It is to be understood, however, that the apparatus 21 is adapted to handle wheels and tires having considerably different widths without necessitating readjustment of the portion 101. A number of arms 102 (there being four in the illustrated embodiment), extend downwardly from the portion 101 and carry axle shafts 103 at their lower end. Supported for rotation on the axle shafts 103 are large diameter tire engaging rollers 104 and a number of smaller diameter wheel rim engaging rollers 105. Spacing rollers 106 are also positioned on the side of the tire engaging rollers 104 opposite to the wheel rim engaging rollers 105. As will become apparent, the wheel 40 and mounted tire 66, 67 is elevated until the rim of the wheel 40 engages the wheel engaging rollers 105. Further elevation of the wheel and tire will then be precluded. The tire engaging rollers 104 engage the tires 66, 67 outwardly of the rim of the wheel 40. As may be seen from FIG. 3, the diameter of the tire engaging rollers 104 is sufficiently large so as to hold the tire 66, 67 away from the bead seat of the wheel on the side of the center of the wheel adjacent the wheel engaging rollers 105. This will also insure that the tire, which as it should be remembered is uninflated, will be engaged with the opposite bead seat of the wheel 40 so that initial rotation of the wheel 40 about its rotational axis will also cause simultaneous rotation of the tire 66, 67. The tire clamping devices 24 are released at this time so that the lower most portion of the tire bead will engage the bead seat of the wheel 40.

The sensing portion of the device 26 may be best understood by reference to FIGS. 7 through 10. In the illustrated embodiment, the sensing portion consists of a number of individual sensing units, indicated generally by the reference numeral 111. In this embodiment of the invention there are four such sensing units 111 disposed between adjacent of the roller assemblies 104, 105 and 106. It is to be understood that a lesser or greater number of sensing units 111 may be provided depending upon the particular application. Also, the sensing unit 111 may be of any known type to sense the proximity of some form of indication supplied on the wheel and tire. These indications will be preferably pre-marked onto the wheel and tire by the respective wheel and tire manufacturers to indicate the high and/or low spots of each element. Although a specific type of sensing device and sensing arrangement will be described, it is to be understood that such a wide variety of sensing units and sensing devices may be employed. Various arrangements will suggest themselves to those skilled in the art and another sensing arrangement will be described late in this specification.

Each sensing unit 111 comprises a fabricated arm 112 that is supported on the element 101 for pivotal movement by means of a pivot pin 113. The arm 112 has an upstanding portion 114 that is connected by means of a pivot pin 115 and clevice 116 to the piston rod 117 of a pneumatically actuated cylinder 118. The cylinder 118 is also supported for pivotal movement by means of a pivot pin 119 so as to accommodate the pivotal movement of the arm 112.

Beneath the table 101 the arm 112 has a generally vertically extending portion 121 and a generally horizontally extending portion 122. A depending arm 123 extends from the radial inner end of the arm portion 122 and carries a roller 124 on a pivot pin fixed to its lower end. The roller 124 is adapted to engage the rim of the associated wheel 40 so as to locate the sensing unit, to be described, accurately relative to the wheel 40.

The arm portion 121 carries a mounting element 125 that is supported by the arm 121 in a manner so as to allow adjustments in a direction perpendicular to that of FIG. 9. A rod 126 is adjustably clamped in the mounting portion 125 so as to permit vertical adjustment of the sensing unit relative to the arm 121. The rod 126 carries a sensor carrier 127 at its lower end. The sensor carrier 127 may be adjusted radially relative to the lower end of the arm 126. A sensing device 128 is carried at the outer end of the sensing support 127 by means of a connection 129 that permits angular adjustment of the sensing device 128 relative to its supporting member 127. The sensing device 128 may be of any type and in the illustrated embodiment is an optical sensor. The optical sensor 128 is adapted to detect a marking placed upon the tire by means of a tire manufacturer which will show up under black light generated from a black light source 131 that is carried by the table 101 adjacent each sensing unit 111.

A wheel sensing device, indicated generally by the reference numeral 132, which may also be of a like optical type to the device 128 is adjustably carried by a mounting bracket 133 which is, in turn, adjustably affixed to a bracket 134 that is affixed to the arm portion 122 adjacent the depending arm end 123. The adjustment in the support for the sensing device 132 permits both radial angular and heighth adjustment of the sensing device 132 relative to the associated wheel. As with the device 128, the sensing device 132 is adapted to sense a marking placed upon the wheel 40 by the wheel manufacturer. Alternatively, the sensing device 132 may sense the location of the valve stem which will have been preassembled into the valve stem hole of the wheel or any other component which is associated with the wheel and which may be used as a marking device.

OPERATION

Before a wheel and mounted tire is delivered to the device 21 all of its various elements are in their retracted position. That is, the rotating device 23 will be lowered so that the wheel can be delivered to it this lowering being accomplished by retraction of the cylinders actuating the piston rods 28. Also, the jaws 41 will be in their retracted position due to depression of the pneumatic piston 51 and the actuating piston 48 (FIG. 3). The tire clamping devices 91 will also be retracted by actuation of the cylinders 95 to draw the piston rods 96 downwardly so that the arm portions 94 will be in their withdrawn position as shown in the phantom line view of FIG. 1. Also, the centering device 25 will be in its retracting position due to actuation of the cylinder 73 to rotate the arms 61, 62, 63 and 64 to the phantom line position shown in FIG. 2. The sensing devices also will be withdrawn by actuation of the cylinders 118 to pivot the arms 121 to the retracted position wherein the sensors 128 and 132 will be clear of the wheel and tire. This retracted position is also shown in the phantom line view of FIG. 9.

A wheel and mounted tire which is uninflated is then delivered to the device 21 by a conveyor (not shown). When a wheel and tire is in proximity to the rotating device 23, the cylinder 73 is actuated to operate the centering device 25. The arms 61, 62, 63 and 64 will then be pivoted inwardly until they contact the periphery of the tire. The solid line view of FIG. 2 shows the contact with the smallest diameter tire 66 whereas a phantom line view shows the contact with a larger diameter tire 67. Regardless of the size of the tire delivered to the station, the centering device 25 will locate it since the rollers 65 will contact the tire and centralize it in view of their simultaneous movement. Once the tire and wheel is centered the cylinder 73 will stall and it can be automatically actuated so as to withdraw the arms 61, 62, 63 and 64 through an appropriate control mechanism.

Once the tire and wheel is centered the rotating device 23 is brought into clamping engagement with the wheel center. For this purpose, the piston 51 is actuated by pressurizing its lower side through the conduit 54 to pivot the bell crank arm 43 and 45 so as to move the jaws 39 outwardly until their portions 41 contact the center opening of the wheel. If desired, this movement can be accomplished while the centering device 25 continues to hold the wheel and tire in its centered position. The centering device 25 can be retracted after the jaws 41 clamp the wheel center. As with the centering device 25, the jaws 41 are capable of engaging wheels having a wide variety of center opening sizes. Once the jaw portions 41 are engaged with the wheel center this engagement is retained by continuing the pressurization of the lower side of the piston 51. This is done to insure that the wheel 42 can be rotated. If desired, other forms of rotating mechanism for insuring rotation of the wheel can be accomplished. For example, a device can be employed that will pass through one of the bolt holes of the wheel. The disclosed arrangement is, however, preferred because it permits a greater latitude in wheel design to be handled without readjustment or modification of the apparatus.

Once the wheel has been clamped within the jaw portions 41, the wheel and mounted tire are elevated by actuation of the piston rods 28. The wheel is elevated until its upper most rim engages the rollers 105 (FIG. 3).

At this time, the tire rollers 104 will engage the sidewalls of the tire as shown in this Figure and urge the tire downwardly into engagement with the opposite or lowermost bead seat of the wheel 40. This will insure that there is sufficient frictional engagement between the wheel 40 and tire so that both will rotate together.

When the wheel 40 and tire are in their fully elevated position against the stop 26, the cylinder 118 is actuated so as to bring the sensing devices 128 and 132 into proximity with the tire and wheel (FIG. 9). The wheel and tire are then rotated by rotating the head 36 through actuation of the chain 34 and sprocket 33. As the wheel and mounted tire rotate, the sensing devices 128 and 132 will commence their reading function and relay the information to an associated control or computer (not shown) which may be of any known type. When the tire marking is in the appropriate position as sensed by one of the sensing devices 128, this information will be fed to the computer and the tire locking devices 91 actuated. When this is done, the cylinders 95 will be pressurized to drive the piston rods 96 outwardly so that the arm portions 94 engage the tire and raise it up off of the rim of the wheel 40. The tire will then effectively be clamped against rotation. If desired, the operation of the rotating device 23 may be stopped at the same time the clamping devices 91 are initially actuated.

Once the computer is aware of which of the sensing devices 128 have sensed the marking on the tire, the wheel is then rotated by rotation of the head 36 until the sensing device 132 of the same sensing unit reads the proximity of the appropriate marking on the wheel. When this point is reached, the rotating unit 23 is stopped so that the wheel and tire will be appropriately matched with each other. Since there is a continuous readout from the sensing devices 132 and 128, it may be that the appropriate marking on the wheel can be lined up more rapidly if the wheel is rotated in an opposite sense from which it had previously been rotating. Through appropriate controls the wheel can be reverse rotated back to proximity with the sensing device 132 to match up the wheel and tire. Of course, various other sequences of operation may be employed.

In the illustrated embodiment, the sensing devices 128 and 130 are of a generally proximity type. That is, they can only read a small area of the wheel and tire and, therefore, it was necessary to rotate either or both of the wheel and tire into proximity with the respective sensing devices 128 and 132 to sense the marking thereon. The apparatus may also be used in conjunction with sensing devices of the type that are adapted to read a larger area. Such sensing devices may comprise electronic cameras for example one of the type sold by General Electric Corporation as Series TN 2500. These devices read a large area and can be programmed with the associated computer so as to sense the marking on either or both of the wheel and tire. If such a device is used, the location of the marking on either the wheel and tire may be sensed prior to rotation of the assembly. With the apparatus described, it would be easiest to sense the location of the marking on the tire. The tire can then be clamped against any further rotation and the marking noted by the associated computer.

The wheel can then be rotated as afore-described until its marking, as sensed by the electronic camera and associated computer, is in the predetermined location relative to the already clamped tire. The rotation of the wheel may then be stopped and the alignment completed. Of course, the computer may sense which direction the wheel should be rotated in so as to align it with the tire in the minimum amount of time. The apparatus for achieveing this is well within the scope of those skilled in the computer art.

It is to be understood that the foregoing description is that of a preferred embodiment of the invention. Some modifications in construction and operation have been described. It is to be understood, however, that various other changes and modifications are possible with the apparatus without departing from the spirit and scope of the invention, as set forth in the appended claims.

I claim:

1. A mechanism for aligning a mounted tire on a wheel in a single station comprising:
   rotating means for rotating at least one of said wheel and tire mounted thereon within said single station;
   holding means actuable for holding one of said wheel and tire against rotation within said single station; and
   sensing means within said single station for sensing a predetermined angular location of one of said wheel and tire, said sensing means being operative to actuate said holding means to prevent rotation of said one of said wheel and tire while the other of said wheel and tire may be rotated, said one of said wheel and tire being thus held by said holding means in a predetermined angular location, said sensing means also being operative to sense an angular position of the other of said wheel and tire and to halt rotation thereof when said sensed angular position of said other of said wheel and tire is located in a predetermined location relative to said predetermined angular location of said one of said wheel and tire, said sensing means thereby assuring accurate relative alignment of said wheel and tire.

2. The invention as set forth in claim 1, wherein the rotating means comprises a single driving element operative to rotate both the wheel and tire.

3. The invention as set forth in claim 2, wherein the means for holding one of the wheel and tire against rotation comprises means for clamping said one of said wheel and tire while said single driving element rotates the other of said wheel and said tire.

4. The invention as set forth in claim 3, wherein the clamping means clamps the tire, said clamping means being arranged so as to clamp the portion of said tire adjacent its bead for holding said bead out of engagement with the associated wheel.

5. The invention as set forth in claim 3, wherein the driving element comprises jaws for clampingly engaging the center of the wheel.

6. The invention as set forth in claim 5, wherein the driving element comprises a head supporting said jaws for reciprocating movement between a retracted position and an engaged position and means for rotating said head and for moving said head axially for raising the wheel and mounted tire from a delivery position to an alignment position.

7. The invention as set forth in claim 1, wherein the machine further includes first sensing means in the station adapted to read an indication on the wheel and second sensing means in the station for reading an indication on the tire.

8. The invention as set forth in claim 7, where there are a plurality of first and second sensing means located at circumferentially spaced, angularly fixed locations in the station.

9. The invention as set forth in claim 8, further including means for rotating the other of the wheel and tire in an opposite sense to the sense which the wheel and tire were rotated prior to the holding of the one of the wheel and tire against rotation if the sensing means indicates that the indication on the other of the wheel and tire was closer to the sensing means which sensed the location of the one of the wheel and tire than the next adjacent sensing means.

10. The invention as set forth in claim 4, wherein the clamping means comprise a plurality of jaws pivotal between a retracted position and an engaged position.

11. The invention as set forth in claim 1, further including stop means adapted to engage the rim of the wheel for locating the wheel in a pre-established position, said stop means being positioned at a spaced axial direction from the rotating means, the rotating means further including lifting means for moving the wheel and mounted tire into engagement with the stop means.

12. The invention as set forth in claim 1 wherein said sensing means are angularly fixed within said station.

13. The invention as set forth in claim 12, wherein the rotating means is operative to also locate the one of the wheel and tire and comprises a single driving element.

14. The invention as set forth in claim 13, wherein the means for holding one of the wheel and tire against rotation comprises means for clamping said one of said wheel and tire while said single driving element rotates the other of said wheel and said tire.

15. The invention as set forth in claim 14, wherein the clamping means clamps the tire, said clamping means being arranged so as to clamp the portion of said tire adjacent its bead for holding the bead out of engagement with the associated wheel.

16. The invention as set forth in claim 14, wherein the drive means comprises jaws for clampingly engaging the center of the wheel.

17. The invention as set forth in claim 16, wherein the driving element comprises a head supporting said jaws for reciprocating movement between a retracted position and an engaged position and means for rotating said head and for moving said head axially for raising the wheel and mounted tire from a delivery position to an alignment position.

18. The invention as set forth in claim 12, wherein the sensing means includes first sensing means adapted to read an indication on the wheel and second sensing means for reading an indication on the tire.

19. The invention as set forth in claim 18, where there are a plurality of first and second sensing means located at circumferentially spaced locations in sensing means.

20. The invention as set forth in claim 19, further including means for rotating the other of the wheel and tire in an opposite sense to the sense where which the wheel and tire were rotated prior to the holding of the one of the wheel and tire against rotation if the sensing means indicates that the indication on the other of the wheel and tire was closer to the sensing means which sensed the location of the one of the wheel and tire than the next adjacent sensing means.

21. The invention as set forth in claim 15, wherein the clamping means comprise a plurality of jaws pivotal between a retracted position and an engaged position.

22. The invention as set forth in claim 12, further including stop means adapted to engage the rim of the wheel for locating the wheel in a pre-established position, said stop means being positioned at a spaced axial direction from the rotating means, the rotating means further including lifting means for moving the wheel and mounted tire into engagement with the stop means.

* * * * *